US012668689B2

(12) United States Patent
Dou et al.

(10) Patent No.: US 12,668,689 B2
(45) Date of Patent: Jun. 30, 2026

(54) POLYOLEFIN PIPE RESIN WITH VERY GOOD SAGGING AND SLOW CRACK GROWTH RESISTANCE

(71) Applicant: Borealis AG, Vienna (AT)

(72) Inventors: Qizheng Dou, Linz (AT); Victor Sumerin, Kulloo (FI); Elena Pomakhina, Linz (AT); Jari Äärilä, Kulloo (FI)

(73) Assignee: BOREALIS GMBH, Vienna (AT)

( * ) Notice: Subject to any disclaimer, the term of this patent is extended or adjusted under 35 U.S.C. 154(b) by 579 days.

(21) Appl. No.: 18/023,931

(22) PCT Filed: Oct. 25, 2021

(86) PCT No.: PCT/EP2021/079556
§ 371 (c)(1),
(2) Date: Feb. 28, 2023

(87) PCT Pub. No.: WO2022/090163
PCT Pub. Date: May 5, 2022

(65) Prior Publication Data
US 2023/0279206 A1      Sep. 7, 2023

(30) Foreign Application Priority Data
Oct. 26, 2020    (EP) .................................... 20203896

(51) Int. Cl.
| | |
|---|---|
| *B29C 48/22* | (2019.01) |
| *B29C 48/00* | (2019.01) |
| *B29C 48/09* | (2019.01) |
| *C08F 10/02* | (2006.01) |
| *C08L 23/0807* | (2025.01) |
| *B29K 23/00* | (2006.01) |

(52) U.S. Cl.
CPC ........ *C08L 23/0815* (2013.01); *B29C 48/022* (2019.02); *B29C 48/09* (2019.02); *C08F 10/02* (2013.01); *B29K 2023/08* (2013.01); *C08L 2203/18* (2013.01); *C08L 2205/025* (2013.01); *C08L 2314/02* (2013.01)

(58) Field of Classification Search
CPC ............. C08L 23/0815; C08L 2203/18; C08L 2205/025; C08L 2314/02; C08L 23/06;

C08L 2207/062; B29C 48/022; B29C 48/09; C08F 10/02; C08F 210/16; C08F 2/001; B29K 2023/08
See application file for complete search history.

(56) References Cited

U.S. PATENT DOCUMENTS

| | | | |
|---|---|---|---|
| 2008/0241510 A1 | 10/2008 | Van Marion et al. | |
| 2017/0002187 A1 * | 1/2017 | Tynys ....................... | F16L 9/12 |
| 2018/0282504 A1 | 10/2018 | Abu et al. | |

FOREIGN PATENT DOCUMENTS

| | | | |
|---|---|---|---|
| EP | 1460105 | * | 9/2004 |
| EP | 1460105 A1 | | 9/2004 |
| EP | 1655339 A1 | | 5/2006 |
| EP | 1719788 | * | 8/2006 |
| EP | 1655339 | * | 10/2006 |
| EP | 1719788 A1 | | 11/2006 |
| EP | 2894195 A1 | | 7/2015 |
| EP | 3109275 | * | 12/2016 |
| EP | 3109275 A1 | | 12/2016 |
| WO | 2006048260 A1 | | 5/2006 |

* cited by examiner

*Primary Examiner* — Kumar R Bhushan
(74) *Attorney, Agent, or Firm* — Lippes Mathias LLP

(57)    ABSTRACT

The invention relates to a polyethylene (PE) composition comprising a base resin which comprises (A) a first ethylene homo- or copolymer fraction, wherein fraction (A) has melt flow rate, MFR2, from 100 to 600 g/10 min; and (B) a second ethylene-1-hexene copolymer fraction, wherein fraction (A) has a lower molecular weight than fraction (B) and wherein fraction (B) is present in an amount of from 50.0 to 58.0 wt. % based on the total weight of the base resin; wherein the base resin has a content of units derived from 1-hexene from 0.44 to 0.79 mol % based on the total amount of base resin; wherein the base resin has a molecular weight distribution, being the ratio of Mw/Mn, from 32 to 40 and the base resin has a Z average molecular weight, Mz, of more than 1,500 kg/mol; wherein the polyethylene composition has a melt flow rate MFR5 from 0.10 to 0.25 g/10 min; and a melt flow rate ratio, FRR21/5, from 30 to 42; and wherein the polyethylene composition has a critical temperature, Tc, in the rapid crack propagation test of –10° C. or lower and not less than –25° C. The invention also relates to a PE composition obtainable by a multistage process, an article comprising a PE composition, a pipe and use of a PE composition comprising a base resin for producing an article.

13 Claims, No Drawings

POLYOLEFIN PIPE RESIN WITH VERY GOOD SAGGING AND SLOW CRACK GROWTH RESISTANCE

CROSS REFERENCE TO RELATED APPLICATIONS

This is a 371 of PCT Application No. PCT/EP2021/079556, filed Oct. 25, 2021, which claims the benefit of European Application No. 20203896.4, filed Oct. 26, 2020, the contents of which are incorporated herein in their entirety.

BACKGROUND

The present invention relates to a polyethylene composition comprising a base resin, a polyethylene composition obtainable by a multistage process, an article comprising a polyethylene composition, a pipe and use of a polyethylene composition comprising a base resin for producing an article.

Polyolefin pipes and especially polyethylene pipes are conventionally used for transport of water, gas as well as industrial liquids and slurries. Due to their versatility, ease of production and installation as well as non-corrosivity, their use is constantly increasing.

The transported fluids may have varying temperatures, usually within the temperature range from about 0° C. to about 50° C. According to ISO 9080 polyethylene pipes are classified by their minimum required strength, i.e. their capability to withstand different hoop stresses during 50 years at 20° C. without fracturing. Thereby, pipes withstanding a hoop stress of 8.0 MPa ($MRS_{8.0}$) are classified as PE80 pipes, and pipes withstanding a hoop stress of 10.0 MPa ($MRS_{10.0}$) are classified as PE100 pipes. The service temperature for PE100 is usually within the temperature range from about 0° C. to about 50° C.

To meet the PE80 requirements with multimodal resins manufactured by conventional Ziegler-Natta catalysts, the density needs to be at least 940 $kg/m^3$ and to meet PE100 requirements the density needs to be above 945 $kg/m^3$. However, the density of a polyethylene resin is directly connected with its crystallinity. The higher the crystallinity of a polyethylene resin the lower its slow crack growth resistance. In other words, all polyethylene materials for pressure resistance of a pipe suffer from the dependency of crystallinity and insofar density and the slow crack growth. When the density is increased, the resistance to slow crack growth (SCG) decreases.

The manufacture of polyethylene materials to be used in pressure pipes is discussed for example in an article by Scheirs et al (Scheirs, Bohm, Boot and Leevers: PE100 Resins for Pipe Applications, TRIP Vol. 4, No 12 (1996) pp. 408-415).

Targets for pipes for the transport of pressurized fluids (so called pressure pipes) to withstand higher and higher (internal) design stresses involve both a higher creep resistance and a higher stiffness. On the other hand, pressure pipes must also fulfil demanding requirements as to their rapid as well as slow crack propagation resistance, must have low brittleness and high impact strength. However, these properties are contrary to each other so that it is difficult to provide a composition for pipes which excels in all of these properties simultaneously. Furthermore, as polymer pipes generally are manufactured by extrusion, or, to a smaller extent, by injection moulding, the polyethylene composition also must have good processability. Finally, the polymer composition used for the pipe must also show good weldability because pipe systems are usually built up by welding or fusion, either as general jointing method between pipe system parts or jointing between layers, for example in multilayer pipe structures e.g. butt fusion, electro fusion, spin welding (friction welding) and hand or automated welding with additional welding materials. Thus, it is important that the composition used must show a certain minimum weld strength. It is known that especially for filled polymer compositions weld strength is usually poor.

It is known that in order to comply with the contrary requirements for a pipe material bimodal polyethylene compositions may be used. Such compositions are described e.g. in EP 0 739 937 and WO 02/102891. The bimodal polyethylene compositions described in these documents usually comprise a low molecular weight polyethylene fraction and a high molecular weight fraction of an ethylene copolymer comprising one or more alpha-olefin comonomers.

EP 1 987 097 in the name of Chevron Phillips Chemical Company discloses a polyethylene suitable for pipes having a pellets' density of 947 $kg/m^3$ to 954 $kg/m^3$ and a $MFR_{21}$, (ASTM D1238, 21.6 kg load) of 1 to 30 g/10 min. The exemplified resins showed weight average molecular weights of 278 to 346 kg/mol at Mw/Mn of from 30.5 to 35.1.

EP 1 781 712 in the name of Univation Tech LLC [US] discloses various compositions, including but not limited to a high strength bimodal polyethylene composition having a density of 0.940 g/cc or more, the composition comprising a high molecular weight polyethylene component having a higher weight average molecular weight (HwHMW) and a low molecular weight polyethylene component having a lower weight average molecular weight (HwLMW), wherein the ratio of the higher weight average molecular weight to the lower weight average molecular weight (MwHMW:MwLMW) is 30 or more; and the composition qualifies as a PE100 material such that in accordance with ISO 1167 a pipe formed from the composition that is subjected to internal pipe resistance has an extrapolated stress of 10 MPa or more when the internal pipe resistance curve is extrapolated to 50 or 100 years in accordance with ISO 9080:2003.

EP 1 922 342 of the Ineos group discloses compositions having a natural density of 935 up to 956 kg/m3 at a melt flow rate (5 kg load) of 0.15 to 0.5 g/10 min, the comonomer being 1-hexene and a dynamic viscosity at 100 rad/s, 190° C. of no more than 2500 Pa·s.

EP 1 985 660 A1 discloses a pipe or a supplementary pipe article with improved slow crack growth resistance comprising a polyethylene composition comprising a base resin, which comprises a first ethylene homo- or copolymer fraction (A), and a second ethylene homo- or copolymer fraction (B), wherein fraction (A) has a lower average molecular weight than fraction (B), and wherein the base resin has a density in the range of 945 to 949 $kg/m^3$, an $MFR_5$ in the range of 0.2 to 0.4 g/10 min, a comonomer content of higher than 2.0 wt. % and a $SHI_{(2.7/210)}$ in the range of 55 to 100.

New installation techniques demand PE resins with higher and higher resistance to slow crack growth. The requirements for slow crack growth become more and more stringent and many of the existing products fail to consistently meet those requirements. At the same time, there is the need to improve the impact resistance of the HDPE pipe resins in order to avoid pipelines' failure by rapid crack propagation.

Therefore, there is still the need for polyethylene compositions with an advantageous slow crack growth resistance in combination with very good sagging resistance and low critical temperature as well as good impact resistance. In addition, these polyethylene compositions should also meet requirements of a PE100 resin.

BRIEF SUMMARY

It is the object underlying the present invention to provide polyethylene compositions meeting the requirements of a PE100 resin having excellent slow crack growth resistance in combination with very good sagging resistance and low critical temperature as well as good impact resistance.

The present invention is based on the surprising finding that such a pipe material can be provided by selecting a specific combination of properties of a multimodal polyethylene base resin in terms of a selected melt flow rate of the low molecular weight (LMW) fraction, a selected amount of the high Mw fraction with a certain molecular weight distribution (MWD), and a selected 1-hexene content in the base resin.

The present invention therefore provides a polyethylene composition comprising a base resin which comprises, or consists of, (A) a first ethylene homo- or copolymer fraction, wherein fraction (A) has a melt flow rate, $MFR_2$, as measured in accordance with ISO 1133 from 100 to 600 g/10 min, preferably from 100 to 550 g/10 min, and more preferably from 115 to 450 g/10 min; and (B) a second ethylene-1-hexene copolymer fraction, wherein fraction (A) has a lower molecular weight than fraction (B) and wherein fraction (B) is present in an amount of from 50.0 to 58.0 wt. %, preferably from 51.0 to 57.0 wt. %, more preferably from 52.0 to 56.0 wt. % and even more preferably from 53.0 to 55.0 wt. % based on the total weight of the base resin;

wherein the base resin has a content of units derived from 1-hexene from 0.44 to 0.79 mol %, preferably from 0.45 to 0.78 mol %, more preferably from 0.46 to 0.77 mol %, and even more preferably from 0.46 to 0.76 mol % based on the total amount of the base resin;

wherein the base resin has a molecular weight distribution, being the ratio of Mw/Mn, from 32 to 40, preferably from 32.5 to 39.5, more preferably from 33 to 39 and the base resin has a Z average molecular weight, Mz, of more than 1,500 kg/mol, preferably more than 1,600 kg/mol, and more preferably more than 1,700 kg/mol;

wherein the polyethylene composition has a melt flow rate, $MFR_5$, from 0.10 to 0.25 g/10 min, preferably from 0.12 to 0.22 g/10 min, and more preferably from 0.14 to 0.20 g/10 min; and a melt flow rate ratio, $FRR_2$~5, from 30 to 42; and wherein the polyethylene composition has a critical temperature, Tc, in the rapid crack propagation test of −10° C. or lower, preferably of −12° C. or lower and not less than −25° C., preferably not less than −23° C.

It has been surprisingly found that an excellent slow crack resistance in combination with low critical temperature along with superior sagging resistance can be achieved if the $MFR_5$ and the $FRR_{21/5}$ of the polyethylene composition and the Mz value as well as the molecular weight distribution of the base resin are within specific limits. Besides, the melt flow rate of the low molecular weight (LMW) component of the polyethylene composition (fraction (A)) needs to be within a certain range and the base resin needs to contain a specific amount of 1-hexene. In addition to that, the ratio of the low molecular weight (LMW) component of the polyethylene composition (fraction (A)) and the high molecular weight (HMW) component of the polyethylene composition (fraction (B)) influences the processability and the balance of properties positively. Surprisingly the polyethylene composition of the present invention has improved properties and in particular an improved balance of properties as mentioned above.

The present invention further provides a polyethylene composition obtainable by a multistage process, the multistage process comprising, or consisting of, the steps of a) polymerizing ethylene in the presence of
    a catalyst,
    in one or more loop reactor(s), preferably in one or two loop reactor(s), in the presence of an alkyl aluminium compound and a chain transfer agent for obtaining fraction (A), the fraction (A) having a melt flow rate, $MFR_2$, from 100 to 600 g/10 min, preferably from 100 to 550 g/10 min, and more preferably from 115 to 450 g/10 min; and b) transferring fraction (A) to a gas phase reactor
    feeding ethylene and comonomer to the gas phase reactor,
    further polymerizing to obtain a base resin comprising fraction (A) obtained in step a) and fraction (B) obtained in step b), wherein fraction (B) of the base resin has a content of units derived from 1-hexene from 0.81 to 1.60 mol %, preferably from 0.83 to 1.59 mol % and more preferably from 0.85 to 1.58 mol % based on the total amount of fraction (B); and wherein fraction (A) has a lower molecular weight than fraction (B) and wherein fraction (B) is present in an amount of from 50.0 to 58.0 wt. %, preferably from 51.0 to 57.0 wt. %, more preferably from 52.0 to 56.0 wt. % and even more preferably from 53.0 to 55.0 wt. % based on the total weight of the base resin;

c) extruding the base resin into a polyethylene composition having a melt flow rate, $MFR_5$, from 0.10 to 0.25 g/10 min, preferably from 0.12 to 0.22 g/10 min, and more preferably from 0.14 to 0.20 g/10 min and having a melt flow rate ratio, $FRR_{21/5}$, from 30 to 42.

The above objects can further be achieved by an article, preferably a pipe or a pipe fitting, more preferably a pipe.

Furthermore, above objects can be achieved by the use of the above polyethylene composition for producing an article, preferably a pipe.

DETAILED DESCRIPTION

A polyethylene composition according to the present invention denotes a polymer derived from at least 50 mol % ethylene monomer units and additional 1-hexene units.

The expression 'ethylene homopolymer' according to the present invention relates to an ethylene polymer that consists substantially, i.e. to least 99% by weight, more preferably at least 99.5% by weight, still more preferably at least 99.8% by weight of ethylene and most preferably is an ethylene polymer which only includes ethylene monomer units.

The term 'base resin' means the entirety of polymeric components in the polyethylene composition according to the invention, i.e. it denotes the polymeric part of the composition without fillers such as carbon black. The base resin usually is making up at least 90 wt % of the total composition. Preferably, the base resin is consisting of polymer fractions (A) and (B), optionally further comprising a prepolymer fraction in an amount of up to 10 wt %, more preferably up to 7 wt %, and most preferably up to 5 wt % of the total base resin. A person skilled in the art will understand that measurements as to properties of the base resin require the presence of stabilizers.

All rheological measurements can be performed with the base resin and with the composition. As a matter of definition, all rheological properties shall preferably also apply to the composition.

The term 'catalyst system' shall denote the composition formed by the catalyst and the cocatalyst.

The melt flow rate (MFR) is an important property of the multimodal polyethylene for pipes according to the invention. The MFR is determined according to ISO 1133 and is indicated in g/10 min. The MFR is an indication of the flowability and, hence, the processability of the polymer. The higher the melt flow rate, the lower the viscosity of the polymer. The MFR is determined at different loadings such as 2.16 kg ($MFR_2$; ISO 1133, condition D), 5 kg ($MFR_5$; ISO 1133, condition T) or 21.6 kg ($MFR_{21}$; ISO 1133, condition G).

The polyethylene composition according to the present invention preferably has a melt flow rate, $MFR_{21}$, from 3 to 8 g/10 min, more preferably from 4 to 7 g/10 min, and even more preferably from 4.5 to 6.5 g/10 min.

Preferably the polyethylene composition has a melt flow rate, $MFR_5$, from 0.12 to 0.22 g/10 min, and more preferably from 0.14 to 0.20 g/10 min.

In a preferred embodiment fraction (A) has a melt flow rate, $MFR_2$, from 100 to 550 g/10 min and more preferably from 115 to 450 g/10 min.

According to a preferred embodiment fraction (A) has a melt flow rate, $MFR_2$, from 100 to 230 g/10 min, preferably from 115 to 210 g/10 min, and more preferably from 130 to 190 g/10 min.

According to another preferred embodiment fraction (A) has a melt flow rate, $MFR_2$, from 231 to 550 g/10 min, preferably from 250 to 450 g/10 min, and more preferably from 270 to 380 g/10 min.

In a preferred embodiment the base resin has a molecular weight distribution, being the ratio of Mw/Mn, from 32.5 to 39.5 and preferably from 33 to 39.

It is further important to ensure that the polymer composition, for example, after being extruded into a pipe and before being cooled, does not flow by gravity from the upper part of the pipe to a lower part and therefore create a non-uniform distribution of polymer around the cross-section of the pipe. This phenomenon is called tendency of a polymer to display gravity flow or 'sagging'. The sagging resistance is the property of a polymer pipe to withstand this tendency. Sagging resistance may be determined by a rheological or a melt index method.

The determination is done in the present invention by a method which correlates well with the above mentioned melt index method, and relates to the rheology of the polymer. The method is based on determination of the viscosity of the polymer at a very low, constant shear stress of 747 Pa ($eta_{747}$). The viscosity of the polymer at this shear stress is determined at a temperature of 190° C. and has been found to be inversely proportional to the gravity flow of the polymer, i.e. the greater the viscosity the lower the gravity flow. According to the present invention the polyethylene composition preferably exhibits a viscosity at $eta_{47}$ of more than 700 kPa*s, preferably of more than 730 kPa*s, even more preferably more 750 kPa*s. The viscosity at $eta_{747}$ is not more than 1400 kPa*s. Usually, the base resin of the polyethylene composition of the present invention has a viscosity at a shear stress of 747 Pa ($eta_{747}$) from 700 to 1400 kPa*s, preferably from 730 to 1300 kPa*s, more preferably from 750 to 1200 kPa*s and even more preferably from 750 to 1100 kPa*s.

It is also important that the polyethylene composition has an excellent slow crack growth resistance.

According to a preferred embodiment the polyethylene composition has a strain hardening modulus of 75 MPa or higher, more preferably of 80 MPa or higher, still more preferably of 85 MPa to 100 MPa, and most preferably of 87 MPa to 100 MPa. Further preferred the strain hardening modulus can be 87 or higher. It is preferred that the strain hardening modulus is from 75 to 110 MPa, preferably from 80 to 105 MPa, and more preferably from 85 to 100 MPa; and/or the polyethylene composition preferably has a failure time in accelerated creep test (ACT) of more than 1500 h, more preferably more than 2000 h and even more preferably more than 3000 h; and/or the polyethylene composition preferably has a failure time in the short term pressure resistance (STPR) test at a stress level of 5.4 MPa at 80° C. of at least 200 h, more preferably of at least 400 h and even more preferably of at least 500 h; and/or the polyethylene composition preferably has a failure time in the short term pressure resistance (STPR) test at a stress level of 12.0 MPa at 20° C. of at least 130 h, more preferably of at least 150 h, even more preferably of at least 175 h, and still more preferably at least 200 h; and/or the polyethylene composition preferably has a stress at yield at 80° C. from 6.0 to 7.0 MPa, preferably from 6.2 to 6.9 MPa and more preferably from 6.3 to 6.8 MPa; and/or the base resin preferably has a viscosity at a shear stress of 747 Pa ($eta_{747}$) of more than 700 kPa*s, more preferably more than 730 kPa*s, even more preferably more than 750 kPa*s and not more than 1400 kPa*s; and/or the polyethylene composition preferably has a critical temperature, Tc, in the rapid crack propagation test of −12° C. or lower and/or not less than −23° C.

Further preferred, the polyethylene composition has a failure time in the accelerated point loading test (PLT+) of more than 1000 h, more preferably more than 2000 h and even more preferably more than 3000 h.

The polymer composition has a good impact resistance along with very good sagging resistance as demonstrated by the balance of properties mentioned above. In addition to that, the composition has a good resistance to rapid crack propagation.

Fraction (B) constitutes the high molecular weight (HMW) component of the polyethylene composition and is a copolymer of ethylene and 1-hexene.

In a preferred embodiment fraction (B) has a content of units derived from 1-hexene from 0.81 to 1.60 mol %, preferably from 0.83 to 1.59 mol % and more preferably from 0.85 to 1.58 mol % based on the total amount of fraction (B).

According to a preferred embodiment the present invention is concerned with a polyethylene composition, wherein the base resin has a content of units derived from 1-hexene from 0.45 to 0.78 mol %, preferably from 0.46 to 0.77 mol % and more preferably from 0.46 to 0.76 mol % based on the total amount of the base resin.

Fraction (A) of the base resin may be an ethylene homo- or copolymer.

If fraction (A) is an ethylene copolymer, it is preferably a copolymer of ethylene with an alpha-olefin having from 3 to 8 carbon atoms, more preferably 4 to 6 carbon atoms, and most preferably is 1-butene or 1-hexene. Preferably, the amount of comonomer, if present, in fraction (A) is 1 mol % or smaller, e.g. from 0.1 to 0.5 mol %.

However, preferably fraction (A) of the base resin is an ethylene homopolymer.

Fraction (A) preferably has a density of 960 to 980 kg/m$^3$.

Fraction (A) and/or fraction (B) may consist of a single polymer fraction made in one reactor, or may consist of two or more partial fractions made in separate reactors.

It is preferred that fraction (A) and/or fraction (B) consist of two partial fractions or a single fraction.

Most preferably, fraction (A) consists of one single fraction or two partial fractions, preferably produced in one or two loop reactors, respectively, and fraction (B) consists of one single fraction, preferably produced in a gas phase reactor.

The base resin of the polyethylene composition of the present invention comprises fractions (A) and (B) which differ (at least) in their molecular weight. Such resins are designated to be multimodal polyethylenes. The prefix "multi" relates to the number of different polymer fractions the base resin is consisting of. Thus, for example, a base resin consisting of two different fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

It is preferred in the present invention that the base resin is a bimodal polyethylene base resin, i.e. the base resin preferably consists of fractions (A) and (B) and, optionally, a small amount of a prepolymer which is considered part of the polymer fraction produced in the first reactor.

If one or more fractions of the base resin consist of partial fractions produced in separate reactors, it is preferred that the reaction conditions are chosen so that essentially the same polymer is produced therein. This means that if, for example and preferably, the base resin consists of fractions (A) and (B) and fraction (A) is produced as two partial fractions in two separate loop reactors under conditions so that essentially the same or the same polymer is produced therein, the base resin will still be a bimodal resin as it consists of two fractions of different polymers.

Another characterizing feature of the present invention is the density of the polyethylene base resin. For reasons of strength the density lies in the medium to high density range, more particularly in the range of 930 to 965 kg/m$^3$. Preferably, densities of 935 to 960 kg/m$^3$ are used. Preferably the density is not higher than 965 kg/m$^3$. It is possible to obtain pressure pipes of a higher design stress rating with high density multimodal polyethylene than with medium density multimodal polyethylene.

Preferably the base resin has a density of at least 945 kg/m$^3$, preferably of from 945 to 951 kg/m$^3$, more preferably from 945 to 949 kg/m$^3$, and even more preferably from 945.5 to 948.5 kg/m$^3$.

According to a preferred embodiment the present invention is concerned with a polyethylene composition, wherein the polyethylene composition has a density of at least 953 kg/m$^3$, preferably from 953 to 962 kg/m$^3$, and even more preferably from 955 to 961 kg/m$^3$.

The base resin preferably has a content of units derived from 1-hexene from 0.45 to 0.78 mol %, preferably from 0.46 to 0.77 mol % and more preferably from 0.46 to 0.76 mol % based on the total amount of the base resin determined by quantitative molten state nuclear-magnetic resonance (NMR) spectroscopy.

Furthermore, the polyethylene composition preferably has a time to failure in the notched pipe test (NPT) of at least 3000 h, preferably at least 4000 h and even more preferably at least 4682 h.

Preferably the polyethylene composition has a Charpy notched impact strength (CIS 23° C.) of at least 30 kJ/m$^2$ and more preferably at least 32 kJ/m$^2$ determined according to ISO 179/1eA:2000 at 23° C. as described in the experimental section below.

Preferably the polyethylene composition has a Charpy notched impact strength (CIS 0° C.) of at least 20 kJ/m$^2$ and more preferably at least 22 kJ/m$^2$ determined according to ISO 179/1eA:2000 at 0° C. as described in the experimental section below.

Further preferred the polyethylene composition has a Charpy notched impact strength (CIS −20° C.) of at least 13 kJ/m$^2$ and more preferably at least 14 kJ/m$^2$ determined according to ISO 179/1eA:2000 at −20° C. as described in the experimental section below.

In addition to the base resin, usual additives for utilization with polyolefins, such as pigments, stabilizers (antioxidant agents), antiacids and/or anti-UVs, antistatic agents and utilization agents (such as processing aid agents) may be present in the polyethylene composition. Preferably, the amount of these additives is 10 wt % or lower, further preferred 8 wt % or lower, still more preferred 4 wt % or lower of the total polyethylene composition.

The composition may comprise carbon black in an amount of 8 wt % or lower, further preferred from 1 to 4 wt %, and even more preferred from 2.0 to 2.5 wt % of the total composition.

Preferably, the base resin makes up at least 90 wt %, more preferably at least 92 wt %, and still more preferably at least 95 wt % of the polyethylene composition.

Furthermore, it is preferred that the polyethylene composition consists of the base resin, carbon black and further (usual) additives in any one of the amounts as herein described.

According to a preferred embodiment, the LMW fraction (fraction A) is an ethylene homopolymer and the HMW fraction (fraction (B)) is an ethylene copolymer. The HMW fraction (fraction (B)) is a copolymer of ethylene and 1-hexene.

According to a preferred embodiment fraction (B) is present in an amount of from 51.0 to 57.0 wt. %, more preferably from 52.0 to 56.0 wt. % and even more preferably from 53.0 to 55.0 wt. % based on the total weight of the base resin.

In the present invention the proportions of the LMW fraction (fraction (A)) and HMW fraction (fraction (B)) (also known as the 'split' between the fractions) are selected properly.

Fraction (A) may also contain a fraction obtained in prepolymerization. More particularly, the weight ratio of the LMW fraction to the HMW fraction should lie in the range of (40-55):(60-45), and preferably (42-51):(58-49), more preferably (43-49):(57-51) and even more preferably (45-47):(55-53). If the split lies within these ranges, the proportion of the HMW fraction results in high strength values such as slow crack growth and pressure resistance as well as a low amount of gels and good processability.

The molecular weight distribution, as defined by the ratio of the weight average molecular weight (Mw) to the number average molecular weight (Mn), i.e. Mw/Mn, of the multimodal polyethylene may range from rather narrow to rather broad values and lies in the range of from 32 to 40, preferably from 32.5 to 39.5 even more preferably from 33 to 39. Further, the number average molecular weight, Mn, of the base resin is 7,300 g/mol or higher, preferably 8,000 g/mol or higher. The base resin has a number average molecular weight, Mn, of 9,200 g/mol or lower, preferably of 9,150 g/mol or lower. Preferably the number average molecular weight lies in the range of from 7,300 to 9,200 g/mol, more preferably from 8,000 to 9,150 g/mol. The weight average molecular weight, Mw, of the base resin lies in the range of from 270,000 to 350,000 g/mol, preferably of from 280,000 to 340,000 g/mol.

Preferably the base resin has a Z average molecular weight, Mz, of more than 1,500 kg/mol, preferably more than 1,600 kg/mol and more preferably more than 1,700 kg/mol, and preferably of not more than 2,200 kg/mol. Preferably the Z average molecular weight, Mz, of the base resin lies in the range of from 1,500 to 2,200 kg/mol, more preferably from 1,600 to 2,100 kg/mol, and even more preferably from 1,700 to 2,000 kg/mol.

According to a further preferred embodiment the polyethylene composition has a meltpressure (both 32 mm and 110 mm pipes) from 20 to 25 MPa (200-250 bar).

In another preferred embodiment the present invention is concerned with a polyethylene composition, wherein the base resin has been produced in a multistage process in the presence of a Ziegler-Natta catalyst.

A multi-stage process is a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homopolymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

In the preferred multi-stage process, the lower molecular weight and higher molecular weight polymers, fractions (A) and (B), are produced in different polymerization steps, in any order.

The LMW polymer (fraction (A)) can be prepared in the first polymerization step and the HMW copolymer (fraction B) in the second polymerization step. This can be referred to as the normal mode and is preferred.

The HMW copolymer fraction (B) may also be prepared in the first polymerization step and the LMW polymer fraction (A) in the second polymerization step. This can be referred to as the reverse mode.

If the LMW fraction is produced in the first polymerization step, the melt flow rate of the first ethylene fraction (A) can be directly measured as described herein. If the LMW fraction is produced in the second polymerization step, the melt flow rate of the LMW ethylene fraction (A) can be calculated on the basis of the weight ratios of the LMW fraction and the HMW fraction and the molecular weight of the total polyethylene composition.

In addition, subtracting GPC curves, when fractions of each polymer are known is also possible for determining melt flow rate of the polymer produced in the second stage of a multi-stage polymerization process.

A two-stage process can, for example be a slurry-slurry or a gas phase-gas phase process, particularly preferably a slurry-gas phase process. Optionally the process according to the invention can comprise one or two additional polymerization steps.

These optional one or two additional polymerization steps preferably comprise slurry polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816 A, 3,405,109 A, 3,324,093 A, EP 479 186 A and U.S. Pat. No. 5,391,654 A.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

In a preferred embodiment of the invention the LMW fraction is produced first and the HMW fraction is produced in the presence of LMW fraction. In this case the LMW fraction is the first polyethylene fraction (A) and the HMW fraction is the second polyethylene fraction (B).

The resulting end product consists of an intimate mixture of the polymer fractions from the reactors, the different molecular-weight-distribution curves of these polymers together forming a molecular-weight-distribution curve having a broad maximum or several maxima, i.e. the end product is a multimodal polymer mixture.

It is preferred that the multimodal base resin of the polyethylene composition according to the invention is a bimodal polyethylene mixture consisting of polymer fractions (A) and (B), optionally further comprising a small prepolymerization fraction. It is also preferred that this bimodal polymer mixture has been produced by polymerization as described above under different polymerization conditions in two or more polymerization reactors connected in series. Owing to the flexibility with respect to reaction conditions thus obtained, it is most preferred that the polymerization is carried out in a loop reactor/a gas-phase reactor combination.

According to a preferred embodiment of the invention, the process comprises a slurry-phase polymerization stage and a gas-phase polymerization stage. One suitable reactor configuration comprises one to two slurry reactors, preferably loop reactors, and one gas-phase reactor. Such polymerization configuration is described e.g. in patent literature, such as in WO 92/12182 A1, WO 96/18662 A1 and WO 2010054732 of *Borealis* and known as Borstar technology.

The catalyst may be transferred into the polymerization zone by any means known in the art. It is thus possible to suspend the catalyst in a diluent and maintain it as homogeneous slurry. Especially preferred it is to use oil having a viscosity from 20 to 1500 mPa*s as diluent, as disclosed in WO 2006/063771 A1. It is also possible to mix the catalyst with a viscous mixture of grease and oil and feed the resultant paste into the polymerization zone.

Further still, it is possible to let the catalyst settle and introduce portions of thus obtained catalyst mud into the polymerization zone in a manner disclosed, for instance, in EP 428054 A1.

The polymerization in slurry usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art.

Furthermore, one or more α-olefin comonomers may be added into the reactor to control the density and morphology of the polymer product. The actual amount of such hydrogen and comonomer feeds depends on the desired melt index (or molecular weight) and density (or comonomer content) of the resulting polymer.

The polymerization in gas-phase may be conducted in a fluidized bed reactor, in a fast-fluidized bed reactor or in a settled bed reactor or in any combination of these.

Typically, the fluidized bed or settled bed polymerization reactor is operated at a temperature within the range of from 50 to 100° C., preferably from 65 to 90° C. The pressure is suitably from 10 to 40 bar, preferably from 15 to 30 bar.

In addition, antistatic agent(s) may be introduced into the slurry and/or gas-phase reactor if needed.

The process may further comprise pre- and post-reactors.

The polymerization steps may be preceded by a prepolymerization step. The pre-polymerization step may be conducted in slurry or in gas phase. Preferably, pre-polymerization is conducted in slurry, and especially in a loop reactor. The temperature in the prepolymerization step is typically from 0 to 90° C., preferably from 20 to 80° C. and more preferably from 30 to 70° C.

The pressure is not critical and is typically from 1 to 150 bar, preferably from 10 to 100 bar.

The polymerization may be carried out continuously or batchwise, preferably the polymerization is carried out continuously.

In a first example of the present process, polymerizing olefins is accomplished in a multistage polymerization process comprising at least one gas-phase reactor for producing ethylene (co)polymers.

In a second example of the present process, polymerizing ethylene with 1-hexene as herein discussed is accomplished in a multi-stage polymerization process comprising at least one slurry reactor, such as one or two slurry reactors, preferably two slurry reactors, and one gas-phase reactor.

A chain-transfer agent, preferably hydrogen, is added as required to the reactors, and preferably 100 to 1400 moles of H2/kmoles of ethylene are added to the reactor, when the LMW fraction is produced in this reactor, and 0 to 70 moles of H2/kmoles of ethylene are added to the gas phase reactor when this reactor is producing the HMW fraction.

The polymerization is conducted in the presence of an olefin polymerization catalyst. The catalyst preferably is a Ziegler-Natta (ZN) catalyst which generally comprises at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), optionally a compound of group 13 of the Periodic Table (IUPAC), and optionally an internal organic compound, like an internal electron donor. A ZN catalyst may also comprise further catalyst component(s), such as a cocatalyst and optionally external additives.

Suitable ZN catalysts preferably contain a magnesium compound, an aluminium compound and a titanium compound supported on a particulate support.

The particulate support can be an inorganic oxide support, such as silica, alumina, titania, silica-alumina, silica-titania or a MgCl$_2$ based support. Preferably, the support is silica or a MgCl$_2$ based support.

Particularly preferred Ziegler-Natta catalysts are such as described in EP 1378528 A1.

If used, the magnesium compound preferably is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is a chlorine containing aluminium alkyl. Especially preferred compounds are aluminium alkyl dichlorides and aluminium alkyl sesquichlorides.

The transition metal compound of Group 4 to 6 is preferably a titanium or vanadium compound, more preferably a halogen containing titanium compound, most preferably chlorine containing titanium compound. Especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable ZN catalysts contain a titanium compound together with a magnesium halide compound acting as a support. Thus, the catalyst contains a titanium compound and optionally a Group 13 compound for example an aluminium compound on a magnesium dihalide, like magnesium dichloride. Such catalysts are disclosed, for instance, in WO 2005/118655, EP 810235, WO 2014/096296 and WO 2016/097193.

Suitable activators are group 13 metal compounds, typically group 13 alkyl compounds and especially aluminium alkyl compounds, where the alkyl group contains 1 to 16 C-atoms. These compounds include trialkyl aluminium compounds, such as trimethylaluminium, triethylaluminium, tri-isobutylaluminium, trihexylaluminium and tri-n-octylaluminium, alkyl aluminium halides, such as ethylaluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

An optional internal organic compound may be chosen from the following classes: ethers, esters, amines, ketones, alcohols, anhydrides or nitriles or mixtures thereof. Preferably, the optional internal organic compound is selected from ethers and esters, most preferably from ethers. Preferred ethers are of 2 to 20 carbon-atoms and especially mono, di or multi cyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl)propane, 2,2-di-(2-furan)-propane, or isomers or mixtures thereof. Internal organic compounds are also often called as internal electron donors.

The composition of the invention preferably is produced in a process comprising a compounding step, wherein the composition, i.e. the blend, which is typically obtained as a polyolefin base resin powder from the reactor, is extruded in an extruder and then pelletized to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

In certain embodiments, the extrusion step is carried out using feed rates of 100 kg/h to 500 kg/h, and more preferably 150 kg/h to 300 kg/h.

The screw speed of the extruder may be 200 rpm to 500 rpm, and more preferably 300 rpm to 450 rpm.

In certain embodiments, in said extrusion step the SEI (specific energy input) of the extruder may be 100 kWh/ton to 400 kWh/ton, and more preferably 125 kWh/ton to 300 kWh/ton.

The melt temperature in said extrusion step is preferably 200° C. to 300° C., and more preferably 230° C. to 270° C.

According to a further aspect the invention relates to a polyethylene composition obtainable by a multistage process as mentioned above, in particular the multistage process comprises, or consists of, the steps of

14 a) polymerizing ethylene in the presence of
   a catalyst,
   in one or more loop reactor(s), preferably in one or two loop reactor(s), in the presence of an alkyl aluminium compound and a chain transfer agent for obtaining fraction (A), the fraction (A) having a melt flow rate, $MFR_2$, from 100 to 600 g/10 min, preferably from 100 to 550 g/10 min, and more preferably from 115 to 450 g/10 min; and
b) transferring fraction (A) to a gas phase reactor
   feeding ethylene and comonomer to the gas phase reactor,
   further polymerizing to obtain a base resin comprising fraction (A) obtained in step a) and fraction (B) obtained in step b),
   wherein fraction (B) of the base resin has a content of units derived from 1-hexene from 0.81 to 1.60 mol %, preferably from 0.83 to 1.59 mol % and more preferably from 0.85 to 1.58 mol % based on the total amount of fraction (B); and
   wherein fraction (A) has a lower molecular weight than fraction (B) and wherein fraction (B) is present in an amount of from 50.0 to 58.0 wt. %, preferably from 51.0 to 57.0 wt. %, more preferably from 52.0 to 56.0 wt. % and even more preferably from 53.0 to 55.0 wt. % based on the total weight of the base resin;
c) extruding the base resin into a polyethylene composition having a melt flow rate, $MFR_5$, from 0.10 to 0.25 g/10 min, preferably from 0.12 to 0.22 g/10 min, and more preferably from 0.14 to 0.20 g/10 min and having a melt flow rate ratio, $FRR_{21/5}$, from 30 to 42.

According to a preferred embodiment the process comprises a prepolymerization step before step a).

Further preferred the polymerization catalyst is a ZN catalyst.

According to a preferred embodiment the base resin has a molecular weight distribution, being the ratio of Mw/Mn, from 32 to 40, preferably from 32.5 to 39.5, and more preferably from 33 to 39; and/or the base resin has a Z average molecular weight, Mz, of more than 1,500 kg/mol, preferably more than 1,600 kg/mol, and more preferably more than 1,700 kg/mol; and/or the base resin has a viscosity at a shear stress of 747 Pa ($eta_{747}$) of more than 700 kPa*s, preferably more than 730 kPa*s, more preferably more than 750 kPa*s and not more than 1400 kPa*s; and/or the polyethylene composition has a critical temperature, Tc, in the rapid crack propagation test of −10° C. or lower, preferably of −12° C. or lower and not less than −25° C., preferably not less than −23° C.

In a further aspect the invention relates to an article comprising, or consisting of, a polyethylene composition according to any one of the embodiments as herein described.

Preferably, the article is a pipe or a pipe fitting.

Further preferred the article is a pipe, wherein the pipe has a resistance to stress cracking measured by the notched pipe test (NPT) of at least 3000 h, more preferably at least 4000 h and even more preferably at least 4682 h.

Further preferred the article is a pipe, wherein the pipe has a critical temperature, Tc, of −10° C. or lower, preferably of −12° C. or lower and more preferably of −13° C. or lower and not less than −25° C., preferably not less than −23° C.; and/or wherein the pipe has a failure time in the accelerated creep test (ACT) of more than 1500 h, preferably more than 2000 h and more preferably more than 3000 h; and/or wherein the pipe has a failure time in the short term pressure resistance (STPR) test at a stress level of 5.4 MPa at 80° C.

of at least 200 h, preferably of at least 400 h and preferably of at least 500 h; and/or wherein the pipe has a failure time in the short term pressure resistance (STPR) test at a stress level of 12.0 MPa at 20° C. of at least 130 h preferably of at least 150 h, more preferably of at least 175 h, and even more preferably at least 200 h.

This demonstrates the excellent balance between pressure resistance, rapid crack propagation resistance and slow crack growth of the inventive pipe.

According to another aspect the invention relates to the use of the polyethylene composition in any one of the embodiments as herein described for producing an article, preferably a pipe or a pipe fitting.

Unless explicitly described otherwise, the description of the present invention is to be understood so that one or more of any of the above described preferred embodiments of the invention can be combined with the invention described in its most general features.

For sake of completeness it should be remarked that while certain properties (such as short term pressure resistance) are tested on specific test pipe specimens (such as pipes of a specific thickness and diameter), they are nevertheless properties of the polymer composition used for making the test pipe specimen.

In the following, the measurement and determination methods for the parameters as used herein are given and the present invention is further illustrated by way of inventive example and comparative example.

Measurement and Determination Methods

Unless otherwise stated the following methods were used for determining the properties of the polymer composition or the components thereof as given in the description or in the experimental part and claims below. Unless otherwise stated, the samples used in the tests consist of the polymer composition or, respectively as specified, of the polymer component to be tested.

Melt Flow Rate

The melt flow rate (MFR) is determined according to ISO 1133 and is indicated in g/10 min. The higher the melt flow rate, the lower the viscosity of the polymer. The MFR is determined at 190° C. for polyethylene and at a loading of 2.16 kg ($MFR_2$), 5.00 kg ($MFR_5$) or 21.6 kg ($MFR_{21}$). The quantity FRR (flow rate ratio) is an indication of molecular weight distribution and denotes the ratio of flow rates at different loadings. Thus, $FRR_{21/5}$ denotes the value of $MFR_{21}/MFR_5$.

Molecular Weight Properties

Molecular weight averages (Mz, Mw and Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)}$$

$$M_w = \frac{\sum_{i=1}^{N} (A_i \times M_i)}{\sum A_i}$$

$$M_z = \frac{\sum_{i=1}^{N} (A_i \times M_i^2)}{\sum (A_i / M_i)}$$

For a constant elution interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/l 2,6-Di-tert-butyl-4-methyl-phenol) as solvent at 160° C. and at a constant flow rate of 1 ml/min. 200 µL of sample solution were injected per analysis. The column set was calibrated using universal calibration (according to ISO 16014-2:2003) with at least 15 narrow MWD polystyrene (PS) standards in the range of 0.5 kg/mol to 11500 kg/mol. Mark Houwink constants used for PS, PE and PP are as described per ASTM D 6474-99. All samples were prepared by dissolving 5.0 to 9.0 mg of polymer in 8 ml (at 160° C.) of stabilized TCB (same as mobile phase) for 2.5 hours for PP or 3 hours for PE at 160° C. under continuous gentle shaking in the autosampler of the GPC instrument.

Density

Density of the polymer was measured according to ISO 1183-1:2004 (method A) on compression moulded specimen prepared according to EN ISO 1872-2(February 2007) and is given in kg/m³.

Pressure Test on Notched Pipes (NPT)

The slow crack propagation resistance is determined according to ISO 13479-2009 in terms of the number of hours the pipe withstands a certain pressure at a certain temperature before failure. The pressure test is carried out on notched SDR11 pipes having an outer diameter of 110 mm. A pressure of 9.2 bars and a temperature of 80° C. have been used. Notching is made with a climb milling cutter with a 60° included-angle V-cutter conforming to ISO 6108, having a cutting rate of 0.010±0.002 (mm/rev)/tooth. The used cutter has 24 teeth and the speed of the cutter is 680 rpm. The remaining ligament is 0.82-0.78 times the minimum wall thickness. The depth of the notch is calculated using equation below. h is the notch depth in mm. The four notches are equally placed in the pipe circumference.

The length of the notch is 110±1 mm.

$$h = 0.5\left[d_{em} - \sqrt{(d_{em}^2 - b_s^2)}\right] + 0.866 b_s$$

where b_s: is the width of machined surface of the notch, in millimetres;

$d_{em}$: is the measured mean pipe outside diameter, in millimetres.

Rapid Crack Propagation (Critical Temperature, Tc)

The rapid crack propagation (RCP) resistance of a pipe may be determined according to a method called the S4 test (Small Scale Steady State), which has been developed at Imperial College, London, and which is described in ISO 13477:2008. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. The length of the pipe is 785 mm. While the exterior of the pipe is at ambient pressure (atmospheric pressure), the pipe is pressurized internally, and the internal pressure in the pipe is kept constant at a pressure of 4.0 bar positive pressure. The length of the gauge is 590 mm. The pipe and the equipment surrounding it are conditioned to a predetermined temperature. A number of discs have been mounted on a shaft inside the pipe to prevent decompression during the tests. A knife projectile is shot, with well-defined forms, and a mass of 1500 g towards the pipe close to its one end in the so-called initiating zone in order to start a rapidly running axial crack. The speed of the knife is 16+/−1 m/s. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.7 diameters, is measured for each test and is plotted against the set test temperature. If the crack length exceeds 4.7 diameters, the crack is assessed to propagate. If the pipe passes the test at a given temperature, the temperature is lowered successively until a temperature is reached, at which the pipe no longer passes the test where the crack propagation exceeds 4.7 times the pipe diameter.

The critical temperature (Tc) i.e. the ductile brittle transition temperature as measured according to ISO 13477: 2008 is the lowest temperature at which the pipe passes the test. The lower the critical temperature the better, since it results in an extension of the applicability of the pipe.

Short Term Pressure Resistance (STPR)

The pressure test on un-notched 32 mm SDR 11 pipes having a length of 450 mm is carried out in water-inside and water-outside environment according to ISO 1167-1:2006. End caps type A were used. The time to failure is determined in hours. A hoop stress of 5.4 MPa, 5.7 MPa and 12.0 MPa and a temperature of 80° C. were applied.

Charpy Impact Strength (CIS)

Charpy impact strength was determined according to ISO179/1eA:2000 on V-notched samples of $80*10*4$ $mm^3$ at 23° C. (Charpy impact strength (23° C.)), at 0° C. (Charpy impact strength (0° C.)) and −20° C. (Charpy impact strength (−20° C.)). Samples were milled from plaques of 4 mm thickness prepared by compression molding according to ISO 293:2004 using the conditions defined in chapter 3.3 of ISO 1872-2:2007.

Stress at Yield (Tensile Testing at 80° C. And Strain Rate of E-4 $s^1$)

5a type specimens according ISO 527-2 were milled from compression moulded plaques. Tensile tests were conducted at 80° C. and a strain rate of E-4 $s^{-1}$ (corresponding to a test speed of 0.3 mm at 50 mm clamping length). The specimens were conditioned at the test temperature for half an hour prior to testing. The yield stress was determined as the first peak in the nominal stress-strain curve. The yielding kinetics in PE at these test conditions display a less pronounced test speed dependence than at room temperature testing and thus correspond better with the long-term yielding properties.

Accelerated Point Loading Test (PLT+)

The accelerated point loading test (PLT+) is carried in accordance with PAS 1075 and simulates an installation situation in which the pipe is disturbed by the external influence of a point load, such as stones or sharp-cornered objects.

The test procedure is similar to the internal pressure creep test, with the difference being that an external point load (generally a punch) is also applied before the internal pressure. To accelerate the test further, a wetting agent solution is applied to the test sample.

The accelerated point load test (PLT+) was performed by Hessel Ingenieurtechnik GmbH, Roetgen, Germany. The ends of a 32 mm or 110 mm outer diameter SDR 11 pipes were closed by using end-caps. One of the end caps was equipped with a pressure connection. The required surface elongation at the inner pipe wall (i.e. the above yield elongation) was produced by a tool displacement from the outer surface along the radius of the pipe with a tool tip radius of 5 mm. The internal pressure of the pipe was selected according to a circumferential stress of 4 $N/mm^2$. The test temperature was 90° C. In order to shorten the testing times the investigations were performed using a 2% aqueous 'Netzmittel 5' (tenside used by Hessel Ingenieurtechnik) in demineralised water which was continuously mixed inside the pipe. The point loading tests have been performed on a single specimen.

Accelerated Creep Test (ACT)

Long-term stability as defined herein as accelerated full notch creep test (FNCT) in particular refers to a resistance against crack growth, which is determined in accordance with the test method FNCTNM5. The results as reported herein concerning FNCTNM5 are results obtained according to ISO16770 as carried out by Hessel Ingenieurtechnik GmbH, Roetgen, Germany.

The materials for testing are made into plaques in following compression moulding conditions:

Heating ramp 15° C./min, 10 min from 30° C. to 180° C., no pressure
   25 bars pressure at 180° C., 35 min
   144 bars pressure at 180° C., 25 min
   Slow Cooling ramp 2° C./min, From 180° C. to 30° C., Pressure 144 bars, 75 min
   Last part, 30° C., 2 min before press opens
   Plaques are round shaped and have diameter of 150 mm and thickness of 10 mm.

The tests are performed on notched specimens, which are machined from the plaques with parallel sides and square cross-sections (10 mm×10 mm). Each specimen was notched perpendicular to the parallel length in the middle of the test specimen. The notched specimens are tested at 90° C. and 4 MPa in 2% aqueous 'Netzmittel 5' (tenside used by Hessel Ingenieurtechnik). 3 specimens were tested for each material and the geometric mean value is reported.

Eta$_{747}$

One method which correlates well with the sagging properties, and is used in connection with the present invention, relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "*Encyclopedia of Polymer Science and Engineering*", $2^{nd}$ Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Strain Hardening (SH) Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 μm thick specimens according to ISO 18488.

Quantification of Microstructure by NMR Spectroscopy

Quantitative nuclear-magnetic resonance (NMR) spectroscopy was used to quantify the comonomer content of the polymer.

Quantitative $^{13}C\{^{1}H\}$NMR spectra recorded in the molten-state using a Bruker Avance Ill 500 NMR spectrometer operating at 500.13 and 125.76 MHz for $^{1}H$ and $^{13}C$ respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 237).

Standard single-pulse excitation was employed utilizing the NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382) and the RS-HEPT decoupling scheme (Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}C\{^{1}H\}$NMR spectra were processed, integrated and relevant quantitative properties determined from the integrals. All chemical shifts are internally referenced to the bulk methylene signal (d) at 30.00 ppm (J. Randall, Macromol. Sci., Rev. Macromol. Chem. Phys. 1989, C29, 201).

Characteristic signals corresponding to the incorporation of 1-hexene were observed (J. Randall, Macromol. Sci., Rev. Macromol. Chem. Phys. 1989, C29, 201). The amount of isolated 1-hexene incorporated in EEHEE sequences was quantified using the integral of the *B4 sites ($I^*_{B4}$) at 38.2 ppm accounting for the number of reporting sites per comonomer:

$$H=I^*_{B4}$$

Characteristic signals resulting from saturated end-groups were observed. The content of such saturated end-groups was quantified using the average of the integral of the signals at 22.8 ppm and 32.2 ppm assigned to the 2s ($I_{2S}$) and 3s ($I_{3S}$) sites respectively:

$$S=(1/2)*(I_{2S}+I_{3S})$$

The amount of ethylene was quantified using the integral of the bulk methylene ($I_d$) sites at 30.00 ppm. This integral included the g site as well as the 3B4 sites from 1-hexene.

The total ethylene content was calculated based on the bulk integral and compensating for the observed 1-hexene sequence and end-group:

$$E=(I_d/2)+(3*H/2)-(H/2)+(3*S/2)$$

The total mole fraction of 1-hexene in the polymer was then calculated as:

$$fH=H/(E+H)$$

The mole percent comonomer incorporation was calculated from the mole fraction:

$$H[mol \%]=100*fH$$

The weight percent comonomer incorporation was calculated from the mole fraction:

$$H[wt \%]=100*(fH*84.16)/((fH*84.16)+((1-fH)*28.05))$$

The comonomer incorporation of 1-hexene in mole percent in high Mw fraction was calculated from the total comonomer incorporation in the usual manner:

$$H \text{ in } HMW[mol \%]=100\%*H[mol \%]/\text{Split of } HMW \text{ fraction [\%]}$$

Note, that amount of HDPE from master batch carrier resin is not taken into account.

Melt Pressure

During pipe extrusion, the melt pressure is continuously measured and recorded with a calibrated melt pressure sensor, which is mounted in the adaptor of the machine. The adaptor is the connector piece between extruder and tool—it is a conical piece, which reduces the diameter from the exit of the machine to the entrance of the tool. The adaptor piece has two holes with threats where the melt pressure sensor and melt temperature sensor are fixed. The used sensor is from company Gefran of Italy, Model Gefran M30-6-M-B07C-1-4-0-XM228, 2130X000X000. The pressure range is up to 700 bars.

Examples

Materials

Comparative Example 5 (CE5) is commercially available black polyethylene compositions Eltex TUB 121N9000 from INEOS.

Catalyst component used in (co)polymerization of ethylene in inventive and comparative examples is Lynx 200, which is a commercially available Ziegler-Natta catalyst manufactured and supplied by Grace Catalysts Technologies.

Preparation of Polymers

Polyethylene base resins and compositions according to the invention (IE1-IE7) and for comparison (CE1-CE4) were produced using Lynx 200 catalyst.

CE1:

A loop reactor having a volume of 50 dm$^3$ was operated at a temperature of 60° C. and a pressure of 56 bar. Into the reactor were fed ethylene, propane diluent and hydrogen. Also a solid polymerization catalyst component Lynx 200 was introduced into the reactor together with triethylaluminium cocatalyst so that the molar ratio of Al/Ti was about 15 mol/mol. The estimated production split was 2 wt %.

A stream of slurry was continuously withdrawn and directed to a loop reactor having a volume of 150 dm$^3$ and which was operated at a temperature of 95° C. and a pressure of 54.5 bar. Into the reactor were further fed additional ethylene, propane diluent and hydrogen so that the ethylene concentration in the fluid mixture was 2.9% by mole and the hydrogen to ethylene ratio was 268 mol/kmol. The estimated production split was 19 wt %. The ethylene homopolymer withdrawn from the reactor had $MFR_2$ of 23 g/10 min.

A stream of slurry from the reactor was withdrawn intermittently and directed into a loop reactor having a volume of 350 $dm^3$ and which was operated at 95° C. temperature and 53 bar pressure. Into the reactor was further added a fresh propane, ethylene, and hydrogen so that the ethylene concentration in the fluid mixture was 3.5 mol % and the molar ratio of hydrogen to ethylene was 242 mol/kmol. The ethylene homopolymer withdrawn from the reactor had $MFR_2$ of 20 g/10 min. The estimated production split was 31 wt %.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 85° C. Additional ethylene and 1-hexene comonomer, nitrogen as inert gas and hydrogen were added so that the molar ratio of hydrogen to ethylene was 1 mol/kmol and the molar ratio of 1-hexene to ethylene was 42 mol/kmol. The estimated production split was 48 wt %. The polymer had a melt flow rate $MFR_5$ of 0.18 g/10 min and a density of 946 $kg/m^3$.

IE1 to IE7 and CE2 to CE4:

The procedure of CE1 was repeated by adapting reactor conditions as described in Table 2.

The polymer powder of each of the samples IE1 to IE7 and CE1 to CE4 was mixed under nitrogen atmosphere with 5.5% of carbon black master-batch (CB content 40%), 2500 ppm of antioxidants and 400 ppm Ca-stearate. Then it was compounded and extruded under nitrogen atmosphere to pellets by using a JSW CIMP90 twin screw extruder with the melt temperature of about 280° C. and SEI between 170-250 kwh/t to obtain the polyethylene compositions.

Pipe Extrusion

Pipe extrusion of 32×3 and 110×10 mm (outer diameter× wall thickness) pipes was performed on a Krauss-Maffei 45-36D (L/D) single screw extruder. The extruder has a modified PP-barrier screw installed with four heated cylinder zones and five tool zones. The downstream equipment is a 9 m spray-cooling vacuum tank with two chambers and a defined water temperature of 20° C.

For 32 mm pipe extrusion, the samples have been processed at an output rate of 50 kg/h and a screw speed of the extruder of ~57 rpm. The achieved melt temperature was 220-221° C. at a melt pressure of 213-216 bars. All samples have been produced at a constant meter weight of 280 g/m and a line speed of 2.97 m/minute.

The 110 mm pipes of the samples have been processed at an output rate of 160 kg/h and a screw speed of 183-185 rpm. The achieved melt temperature was 209° C. at a melt pressure of 201-205 bars. All samples have been produced at a constant meter weight of 3.13 kg/m and 0.85 m/minute.

TABLE 1

| Temperature profile for pipe extrusion of 32 mm and 110 mm pipes. | | |
|---|---|---|
| | Temperature profile 32 × 3 mm pipes [° C.] | Temperature profile 110 × 10 mm pipes [° C.] |
| Inlet zone | 75 | 75 |
| Barrel zone 1 | 220 | 225 |
| Barrel zone 2 | 215 | 220 |
| Barrel zone 3 | 210 | 215 |
| Barell zone 4 | 210 | 210 |
| Barrel zone 5 | 200 | 210 |
| Adaptor | 200 | 200 |
| Tool zone 1 | 200 | 200 |
| Tool zone 2 | 200 | 200 |
| Tool zone 3 | 200 | 200 |
| Tool zone 4 | 210 | 210 |
| Tool zone 5 | 210 | 210 |

| | Polymerization conditions for IE1 to IE7 and CE1 to CE4 | | | | | | | | | | |
|---|---|---|---|---|---|---|---|---|---|---|---|
| Example | IE1 | IE2 | IE3 | IE4 | IE5 | IE6 | IE7 | CE1 | CE2 | CE3 | CE4 |
| Prepoly. reactor | | | | | | | | | | | |
| Temp. (° C.) | 50 | 50 | 50 | 60 | 50 | 50 | 50 | 60 | 60 | 60 | 60 |
| Press. (kPa) | 5666 | 5628 | 5649 | 5840 | 5720 | 5767 | 5782 | 5626 | 5622 | 5630 | 5652 |
| Split (wt. %) | 2 | 2 | 2 | 2 | 2 | 2 | 2 | 2 | 2 | 2 | 2 |
| First loop reactor | | | | | | | | | | | |
| Temp. (° C.) | 95 | 95 | 95 | 95 | 95 | 95 | 95 | 95 | 95 | 95 | 95 |
| Press. (kPa) | 5484 | 5508 | 5513 | 5533 | 5545 | 5537 | 5551 | 5452 | 5452 | 5467 | 5475 |
| C2 conc. (mol %) | 3.0 | 3.1 | 3.0 | 2.5 | 3.0 | 3.1 | 3.1 | 2.9 | 4.4 | 2.9 | 3.3 |
| H2/C2 ratio (mol/kmol) | 667 | 672 | 669 | 710 | 598 | 579 | 583 | 268 | 328 | 1057 | 1298 |
| Split % | 19 | 19 | 19 | 18 | 20 | 20 | 20 | 19 | 18 | 20 | 17 |
| $MFR_2$ (g/10 min) | 310 | 315 | 310 | 212 | 170 | 128 | 135 | 23 | 27 | 539 | 296 |
| Second loop reactor | | | | | | | | | | | |
| Temp. (° C.) | 95 | 95 | 95 | 95 | 95 | 95 | 95 | 95 | 95 | 95 | 95 |
| Press. (kPa) | 5321 | 5276 | 5302 | 5213 | 5390 | 5437 | 5445 | 5298 | 5296 | 5302 | 5303 |
| C2 conc. (mol %) | 3.3 | 3.4 | 3.4 | 3.2 | 3.1 | 3.0 | 3.1 | 3.5 | 3.9 | 4.5 | 3.9 |
| H2/C2 ratio (mol/kmol) | 735 | 738 | 741 | 641 | 588 | 583 | 581 | 242 | 371 | 1067 | 1303 |
| Split % | 26 | 26 | 26 | 26 | 24 | 24 | 24 | 31 | 20 | 25 | 20 |
| Density by balance, plaque | 971 | 971 | 971 | 971 | 971 | 971 | 971 | — | — | — | — |
| $MFR_2$ (g/10 min) | 312 | 320 | 320 | 376 | 180 | 166 | 170 | 20 | 36 | 514 | 420 |

-continued

| | Polymerization conditions for IE1 to IE7 and CE1 to CE4 | | | | | | | | | | |
|---|---|---|---|---|---|---|---|---|---|---|---|
| Example | IE1 | IE2 | IE3 | IE4 | IE5 | IE6 | IE7 | CE1 | CE2 | CE3 | CE4 |
| Gas phase reactor | | | | | | | | | | | |
| Temp. (° C.) | 85 | 85 | 85 | 85 | 85 | 85 | 85 | 85 | 85 | 85 | 85 |
| Press. (kPa) | 2000 | 2000 | 2000 | 2000 | 2000 | 2000 | 2000 | 2000 | 2000 | 2000 | 2000 |
| H2/C2 ratio (mol/kmol) | 11 | 9 | 9 | 22 | 14 | 11 | 11 | 1 | 29 | 5 | 27 |
| C6/C2 ratio (mol/kmol) | 50 | 46 | 44 | 28 | 46 | 50 | 49 | 42 | 30 | 40 | 34 |
| split % | 53 | 53 | 53 | 54 | 54 | 54 | 54 | 48 | 60 | 53 | 61 |
| Base resin properties | | | | | | | | | | | |
| Density (kg/m³) | 947 | 947 | 947 | 947 | 947 | 947 | 947 | 946 | 946 | 945 | 946 |

TABLE 3

| | Properties of the base resins and the polyethylene compositions for IE1 to IE7 and CE1 to CE5 | | | | | | | | | | | |
|---|---|---|---|---|---|---|---|---|---|---|---|---|
| Example | IE1 | IE2 | IE3 | IE4 | IE5 | IE6 | IE7 | CE1 | CE2 | CE3 | CE4 | CE5 |
| Base resin | | | | | | | | | | | | |
| Density (kg/m³) | 947 | 947 | 947 | 947 | 947 | 947 | 947 | 946 | 946 | 945 | 946 | NA |
| Polyethylene composition | | | | | | | | | | | | |
| MFR5 [g/10 min] | 0.18 | 0.16 | 0.15 | 0.15 | 0.20 | 0.16 | 0.15 | 0.17 | 0.16 | 0.16 | 0.17 | 0.22 |
| MFR21 [g/10 min] | 6.06 | 5.82 | 5.79 | 4.95 | 6.08 | 5.47 | 5.24 | 6.10 | 3.45 | 6.42 | 4.99 | 7.52 |
| FRR21/5 | 33.1 | 36.4 | 38.6 | 33.2 | 30.4 | 34.2 | 34.9 | 35.9 | 21.6 | 40.1 | 29.4 | 34.2 |
| Mn [g/mol] | 8700 | 8520 | 8680 | 8510 | 8415 | 8845 | 8945 | 11150 | 12450 | 7310 | 8440 | 9225 |
| Mw [g/mol] | 306000 | 331000 | 317000 | 295000 | 300500 | 323000 | 315000 | 290500 | 255000 | 288500 | 268000 | 240000 |
| Mz [g/mol] | 1815000 | 1980000 | 1860000 | 1720000 | 1755000 | 1850000 | 1800000 | 1730000 | 1270000 | 1685000 | 1440000 | 1245000 |
| Mw/Mn | 35.2 | 38.8 | 36.5 | 34.7 | 35.7 | 36.5 | 35.2 | 26.1 | 20.5 | 39.5 | 31.8 | 26.0 |
| C6 total [mol %] | 0.61 | 0.56 | 0.55 | 0.60 | 0.46 | 0.52 | 0.52 | 0.76 | 0.48 | 0.88 | 0.70 | 0.46 |
| C6 in HMW fraction [mol%] | 1.15 | 1.06 | 1.04 | 1.11 | 0.85 | 0.96 | 0.96 | 1.58 | 0.80 | 1.65 | 1.15 | NA |
| Eta747 [kPa · s] | 786.44 | 1015 | 966.5 | 986.22 | 737 | 888 | 986 | 1383.5 | 671.49 | 917.68 | 701.32 | 828.12 |
| SH modulus [MPa] | 95.9 | 93.3 | 90.4 | 87.6 | 75.5 | 84.1 | 85.1 | 88.0 | 68.3 | 103.2 | 84.4 | 87.3 |
| Density [kg/m³] | 957.0 | 958.2 | 958.8 | 957.6 | 959.8 | 958.4 | 958.2 | 956.1 | 955.8 | 956 | 955.7 | 959.4 |
| SPTR (12.0 MPa/ 20° C.) [h] | 252.3 | 460.5 | 420.0 | 203.7 | — | — | — | 100.4 | 113.4 | 50.2 | 102.3 | — |
| SPTR (5.4 MPa/ 80° C.) [h] | 373.0 | 3636.4 | 2125.3 | 487.4 | — | — | — | — | — | 3.5 | — | — |
| Tc [° C.] | −13.9 | −16.5 | −15.6 | −15.7 | — | — | — | −16.8 | −31.8 | −12.4 | −17.6 | — |
| CIS (23° C. [KJ/m²] | 40.65 | 38.58 | 36.54 | — | 32.57 | 38.36 | 40.2 | — | — | — | — | 35.85 |
| CIS (0° C.) [KJ/m²] | 29.23 | 28.45 | 25.97 | — | 22.27 | 27.66 | 27.93 | 43.7 | 42.66 | 41.25 | 37.76 | 22.45 |
| CIS (−20° C.) [KJ/m²] | 17.5 | 16.99 | 17.0 | — | 14.93 | 18.05 | 19.64 | 24.02 | 28.51 | 22.86 | 22.43 | 14.63 |
| PLT+, 110 mm pipes [h] | >3500 | >3500 | >3500 | — | — | — | — | — | — | — | — | — |
| ACT [h] | >3000 | >3000 | >3000 | — | — | — | — | 3636 | — | — | 3111.4 | — |
| NPT [h] | >4682 | >4682 | >4682 | — | — | — | — | >12961 | 6556 | 361 | >12097 | — |
| Meltpressure, bar (110 mm) | 205 | 204 | 201 | 225 | — | — | — | 198 | 273 | 196 | 231 | — |
| Meltpressure, bar (32 mm) | 216 | 215 | 213 | 236 | — | — | — | 207 | 285 | 208 | 244 | — |
| Carbon Black (wt. %) | 2.2 | 2.2 | 2.2 | 2.3 | 2.3 | 2.2 | 2.2 | 2.3 | 2.3 | 2.6 | 2.1 | — |
| Stress at yield, MPa, 0.3 mm/min | 6.24 | 6.35 | 6.36 | 6.11 | — | — | — | 6.18 | 6.69 | 5.65 | 6.03 | 6.73 |

As can be derived from Table 3, IE1 to IE7 demonstrate the combination of excellent slow crack growth resistance together with very good impact resistance and good rapid crack propagation resistance (low critical temperature), while also meeting the requirements of PE100 standard and having very good sagging resistance (as demonstrated e.g. by Mz values). Furthermore, the compositions of IE1 to IE7 also show excellent behavior in the accelerated point loading test and in the ACT test.

This advantageous combination of properties is achieved by the specific Mz and $\mathrm{eta}_{747}$ values of the composition, the specific MWD (as demonstrated by Mw/Mn and $\mathrm{FRR}_{21/5}$ values), the specific amount of 1-hexene in the high molecular weight fraction, the specific amount (weight fraction) of the high molecular weight fraction, the MFR in the defined range and the specific comonomer used (1-hexene).

Comparative Examples 1 to 5 demonstrate that deviations from the inventive polymer structure yield in polymer compositions having inferior property combinations compared to IE1 to IE7. None of Comparative examples 1 to 5 has the advantageous combination of properties of the inventive polymer compositions.

The invention claimed is:

1. A polyethylene composition comprising a base resin which comprises
  (A) a first ethylene homo- or copolymer fraction, wherein fraction (A) has melt flow rate, $\mathrm{MFR}_2$, as measured in accordance with ISO 1133 from 100 to 600 g/10 min; and
  (B) a second ethylene-1-hexene copolymer fraction, wherein fraction (A) has a lower molecular weight than fraction (B) and wherein fraction (B) is present in an amount of from 50.0 to 58.0 wt. % based on the total weight of the base resin;

wherein the base resin has a content of units derived from 1-hexene from 0.44 to 0.79 mol % based on the total amount of base resin;

wherein the base resin has a molecular weight distribution, being the ratio of Mw/Mn, from 32 to 40 and the base resin has a Z average molecular weight, Mz, of more than 1,500 kg/mol;

wherein the polyethylene composition has a melt flow rate $MFR_5$ from 0.10 to 0.25 g/10 min; and a melt flow rate ratio, $FRR_{21/5}$, from 30 to 42; and wherein the polyethylene composition has a critical temperature, Tc, in the rapid crack propagation test of −10° C. or lower and not less than −25° C.

2. Polyethylene composition according to claim 1, wherein the polyethylene composition has a strain hardening modulus of 75 MPa or higher; or wherein the polyethylene composition has a failure time in accelerated creep test (ACT) of more than 1500 h; or wherein the polyethylene composition has a failure time in the short term pressure resistance (STPR) test at a stress level of 5.4 MPa at 80° C. of at least 200 h; or wherein the polyethylene composition has a failure time in the short term pressure resistance (STPR) test at a stress level of 12.0 MPa at 20° C. of at least 130 h; or wherein the polyethylene composition has a stress at yield at 80° C. from 6.0 to 7.0 MPa; or wherein the base resin has a viscosity at a shear stress of 747 Pa ($eta_{747}$) of more than 700 kPa*s.

3. Polyethylene composition according to claim 1, wherein fraction (A) has a melt flow rate, $MFR_2$, as measured in accordance with ISO 1133 from 100 to 230 g/10 min; or wherein fraction (A) has a melt flow rate, $MFR_2$, as measured in accordance with ISO 1133 of 231 to 550 g/10 min.

4. Polyethylene composition according to claim 1, wherein fraction (B) of the base resin has a content of units derived from 1-hexene from 0.81 to 1.60 mol %, based on the total amount of fraction (B); or wherein fraction (B) is present in an amount of from 51.0 to 57.0 wt. %, based on the total weight of the base resin.

5. Polyethylene composition according to claim 1, wherein the base resin has a number average molecular weight, Mn, of 7,300 g/mol or higher; or wherein the base resin has a number average molecular weight, Mn, of 9,150 g/mol or lower; or wherein the base resin has a molecular weight distribution, being the ratio of Mw/Mn, from 32.5 to 39.5; or wherein the base resin has a Z average molecular weight, Mz, of more than 1,600 kg/mol.

6. Polyethylene composition according to claim 1, wherein the base resin has a density of at least 945 kg/m³; or wherein the polyethylene composition has a density of at least 953 kg/m³; or wherein the base resin has a content of units derived from 1-hexene from 0.45 to 0.78 mol %, based on the total amount of the base resin.

7. Polyethylene composition according to claim 1, wherein the polyethylene composition has a melt flow rate, $MFR_5$, from 0.12 to 0.22 g/10 min; oe wherein the polyethylene composition has a critical temperature, Tc, in the rapid crack propagation test of −12° C. or lower and/or not less than −23° C.

8. A process for producing a polyethylene composition according to claim 1, comprising the steps of:

a) polymerizing ethylene in the presence of a Ziegler-Natta catalyst, in one or more loop reactor(s), in the presence of an alkyl aluminium compound and a chain transfer agent for obtaining fraction (A), the fraction (A) having a melt flow rate, $MFR_2$, from 100 to 600 g/10 min; and b) transferring fraction (A) to a gas phase reactor feeding ethylene and comonomer to the gas phase reactor, further polymerizing to obtain a base resin comprising fraction (A) obtained in step a) and fraction (B) obtained in step b), wherein fraction (B) of the base resin has a content of units derived from 1-hexene from 0.81 to 1.60 mol %, based on the total amount of fraction (B); and wherein fraction (A) has a lower molecular weight than fraction (B) and wherein fraction (B) is present in an amount of from 50.0 to 58.0 wt. %, based on the total weight of the base resin; and c) extruding the base resin into a polyethylene composition having a melt flow rate, $MFR_5$, from 0.10 to 0.25 g/10 min, and having a melt flow rate ratio, $FRR_{21/5}$, from 30 to 42.

9. The polyethylene composition according to claim 8, wherein the polymerization catalyst is a Ziegler-Natta catalyst.

10. An article comprising the polyethylene composition according to claim 1.

11. The article according to claim 10 being a pipe or pipe fitting.

12. A pipe according to claim 11, wherein the pipe has a critical temperature, Tc, in the rapid crack propagation test of −10° C. or lower and not less than −25° C.; or wherein the pipe has a failure time in the accelerated creep test (ACT) of more than 1500 h; or wherein the pipe has a failure time in the short term pressure resistance (STPR) test at a stress level of 5.4 MPa at 80° C. of at least 200 h; or wherein the pipe has a failure time in the short term pressure resistance (STPR) test at a stress level of 12.0 MPa at 20° C. of at least 130 h.

13. A method for producing an article, comprising extruding the composition of claim 1.

* * * * *